3/17/87 XR 4,650,989

United States Patent [19]

Frigon

[11] Patent Number: 4,650,989

[45] Date of Patent: Mar. 17, 1987

[54] ALIGNMENT APPARATUS FOR PHOTOELECTRIC INTRUSION DETECTOR SYSTEM

[75] Inventor: Raymond A. Frigon, Watertown, Conn.

[73] Assignee: Cerberus AG, Mannedorf, Switzerland

[21] Appl. No.: 688,916

[22] Filed: Jan. 4, 1985

[51] Int. Cl.[4] .............................................. G01T 1/16

[52] U.S. Cl. .................................... 250/221; 340/557; 356/153

[58] Field of Search ................ 250/221, 239; 340/555, 340/556, 557; 356/141, 152, 153

[56] References Cited

U.S. PATENT DOCUMENTS 3,535,539 10/1970 Malespina et al. .................. 250/239
3,752,978 8/1973 Kahl, Jr. et al. .................... 250/340

FOREIGN PATENT DOCUMENTS 0005853 12/1979 European Pat. Off. .
0880409 10/1961 United Kingdom .

*Primary Examiner*—Eugene R. LaRoche
*Assistant Examiner*—Robert J. Pascal
*Attorney, Agent, or Firm*—Brumbaugh, Graves, Donohue & Raymond

[57] ABSTRACT

An alignment apparatus for a photoelectric transmitter or receiver having an emitter or detector at the focal point of a focusing lens or mirror includes a plane mirror located between the emitter or detector and the focusing device. The mirror is provided with an aperture behind which the emitter or detector is located. A center line indicating sight is provided between the focusing device and the emitter or detector. By observing the plane mirror from an appropriate angle the transmitter or receiver can be aligned with its counterpart transmitter or receiver.

15 Claims, 9 Drawing Figures

ALIGNMENT APPARATUS FOR PHOTOELECTRIC INTRUSION DETECTOR SYSTEM

BACKGROUND OF THE INVENTION

The present invention relates to photoelectric intrusion detector systems of the type including a transmitter unit which projects a beam of optical radiation, as, for example, infrared energy, and a receiver unit which contains means for detecting said optical radiation. Generally, the interruption of the beam of optical radiation indicates the presence of a person or object, and may operate a door or an alarm signal. It is well known that the transmitters and receivers of such systems must be optically aligned with each other. The present invention relates to such alignment of transmitters and receivers.

Some prior art systems of this type have used a visible light at the transmitter or at the receiver for purposes of aligning the optical systems. This often requires installation under low-light conditions so that the projected light is visible for alignment purposes.

It is an object of this invention to provide a photoelectric intrusion detector system of the type discussed above in which the need for an alignment light is eliminated. It is a further object of this invention to provide an intrusion detection system which is easily aligned under ambient light conditions.

SUMMARY OF THE INVENTION

The invention comprises an alignment apparatus for a directionally adjustable transmitter and receiver of a photoelectric detecting system, having focusing means with a real focal point, a source or detector of optical radiation located near said focal point and defining an optical axis.

The transmitter's alignment apparatus comprises a first plane mirror located between the radiation source and focusing means near the focal point. The first plane mirror has an aperture on the optical axis and is mounted at a certain angle with respect to the optical axis. Also provided is a center-line indicating sight, visible in the first plane mirror, and designating the location of the optical axis. As a result, a virtual image of the field of view of the focusing means is visible in the first plane mirror and when the desired field of view is centered over the aperture along the optical axis, alignment is achieved.

In a preferred embodiment, the alignment apparatus for the transmittor is arranged within a housing having a removable cover and a viewing angle from outside the housing. In addition, the transmitter's focusing means may include a lens, and second plane mirror located between the lens and radiation source for changing the direction of the optical axis. The center-line indicating sight may be etched on the second plane mirror, and the lens and second plane mirror may be pivotally mounted on a carriage so as to enable adjustment of the direction of the optical axis outside the transmitter. Lastly, the first plane mirror may form the surface of an enclosure within which may be mounted the radiation source.

For a directionally adjustable receiver the new apparatus contains a first plane mirror located between the radiation detector and focusing means near the focal point. The first plane mirror has an aperture on the optical axis and is mounted at a certain angle with respect to the optical axis. Also provided is a center-line indicating sight, visible in said first plane mirror, and designating the location of the optical axis. As a result, a virtual image of the field of view of the focusing means is visible in the first plane mirror and when the desired field of view is centered over the aperture along the optical axis, alignment is achieved.

In a preferred embodiment, the alignment apparatus for the receiver is arranged within a housing having a removable cover and a viewing angle from outside the housing. In addition, the receiver's focusing means may include a lens, and second plane mirror located between the lens and radiation detector for changing the direction of the optical axis. The center-line indicating sight may be etched on the second plane mirror, and the lens and second plane mirror may be pivotally mounted on a carriage so as to enable adjustment of the direction of the optical axis outside the receiver. The first plane mirror may also form the surface of an enclosure within which may be mounted the radiation detector. The radiation detector may also be mounted within a metal box within the enclosure with the metal box providing radio frequency isolation and having external leads emerging through isolation capacitors. In addition, the radiation detector may be mounted on a circuit board and separated therefrom by tubular spacers surrounding the leads of the detector. Lastly, the metal box may be provided with a cover and a foam cushion between the cover and the circuit board.

The invention, together with further objects, advantages, features and aspects thereof will be more clearly understood from the following description taken in conjunction with the accompanying drawings.

DESCRIPTION OF THE INVENTION

Figure 1:
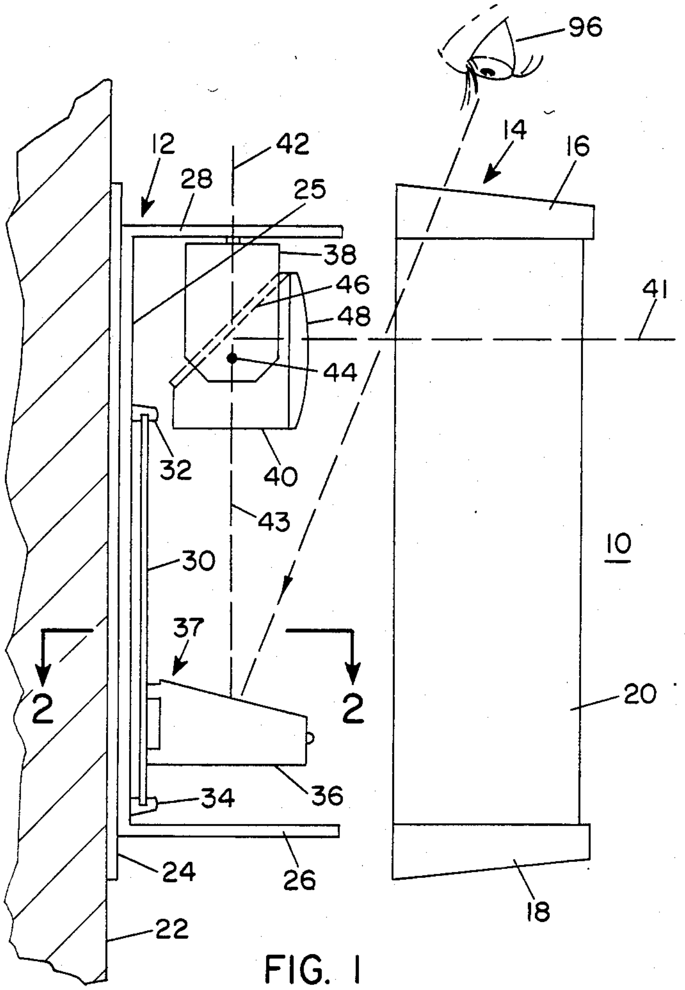
FIG. 1 is a side view of the photoelectric transmitter or receiver having an alignment arrangement in accordance with the present invention. The cover portion is shown unattached to the right of the transmitter or receiver.

FIG. 1 illustrates a side view of a photoelectric transmitter or receiver unit 10 having an alignment arrangement in accordance with the present invention. Unit 10 includes a main portion 12 and a cover portion 14 which are shown in a separated position. It should be understood that under normal conditions of usage cover portion 14 would fit over main portion 12 and be secured thereto by screws or clips.

Cover portion 14 includes an upper opaque support portion 16 and a corresponding lower support portion 18 between which there is mounted an infrared transmissive window 20. Window 20 has a wrap-around configuration, which permits infrared radiation to be transmitted through it from at least three sides with respect to a wall 22 on which the unit is mounted. Main portion 12 of unit 10 includes a flange 24 by which the unit is mounted against a vertical surface, such as wall 22. Supporting portions 25, 26 and 28 are provided for holding the operative components of the photoelectric transmitter or receiver unit. Outwardly extending upper support member 28 supports a carriage 38, which is pivotable about a vertical axis 42. Carriage 38 has mounted to it a lens unit 40, which includes a focusing lens 48 and a slanted mirror surface 46, which are together pivotable with respect to carriage 38 about horizontal axis 44. By rotation of carriage 38 about vertical axis 42 and rotation of lens unit 40 about horizontal axis 44 radiation can be transmitted or received by unit 10 from a wide range of horizontal and vertical angles with respect to wall 22.

Vertical support portion 25 is provided with clips 32 and 34 which support a circuit board 30 of conventional design. Mounted on circuit board 30 is enclosure 36 which encloses the transmitting or receiving transducer, and also includes a plane reflecting surface 37 upwardly facing in FIG. 1, which will be further described. An outwardly extending lower support portion 26 is also provided, and usually is used for purposes of engaging the lower support portion 18 of cover 14.

Figure 2:
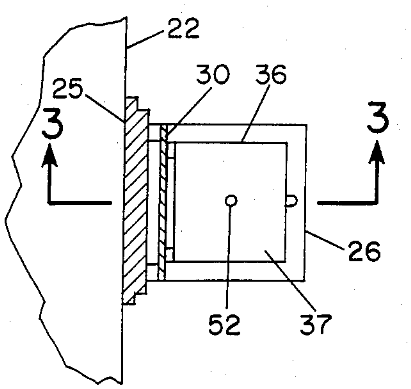
FIG. 2 is a top cross-sectional view taken substantially along the line 2—2 of FIG. 1.

FIG. 2 is a cross-sectional view of the main portion 12 of unit 10 as shown in FIG. 1. Cross-sectional view 2 shows the top, plane mirror surface 37 of enclosure 36. At the approximate center of the top mirror surface 37 of enclosure 36 there is provided an aperture 52 behind which is located either a transmitting or receiving light transducer. Accordingly, in a transmitting unit, a light emitting diode might be located behind aperture 52. In a receiving unit a photodetector would be located at this position. Aperture 52, and the diode or detector is located approximately at the focal point of focusing lens 48 as reflected by mirror surface 46. Accordingly, the mirrored surface of enclosure 36 is also approximately located at the focal point.

Figure 3:
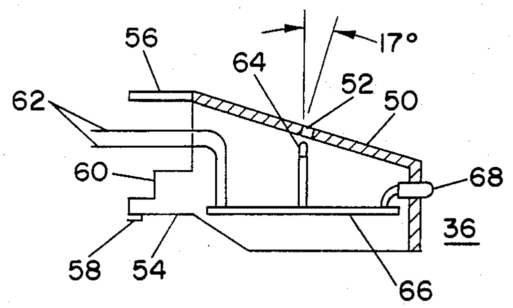
FIG. 3 is a side cross-section view taken substantially along the line 3—3 of FIG. 2, and represents a unit which acts as a photoelectric transmitter.

FIG. 3 is an enlarged cross-section of the enclosure 36 taken along lines shown in FIG. 2 for a unit which acts as a photoelectric transmitter. Enclosure 36 may be made of plastic material which is coated with reflective metalizing material, such as chromium. The reflective coating is required only on the upper surface of enclosure 36, but may incidentally be included on other surfaces. Enclosure 36 includes aperture 52, which was previously described, behind which there is provided a light emitting diode 64. The upper reflecting surface 50 of enclosure 36 is slanted, for example, at an angle of approximately 17°, to provide for a convenient viewing angle as will be further described.

Enclosure 36 includes legs 56 and 58 on each side, only two being shown in the FIG. 3 cross-section. Legs 56 and 58 have stepped portions 60 which rest on circuit board 30 and extending portions with tapered protrusions 58 which pass through circuit board 30 and engage the circuit board from the lower side to hold the enclosure in position on circuit board 30. Electrical leads 62 also pass through and become connected to circuit board 30. Within enclosure 36 the transmitter includes a circuit board 66 which has transmitter components including light emitting diode 64 from which light is transmitted, and optionally an additional light emitting diode 68, which may provide a local indicator for an auxiliary contact connected to the transmitter.

Those skilled in the art will recognize that main unit 12 in a transmitter or a receiver will include additional units and items not shown, such as circuit components on circuit board 30 and connections for wiring into an alarm system. These components are not specifically shown in the drawings since they are not germain to the present invention and are well known to those skilled in the art.

For normal operation of a transmitter, light from light emitting diode 64 radiates along an optical axis 43, is reflected by mirror surface 46 and focused into an external beam along external optical axis 41 by lens 48. Optical axes 41 and 43 are defined by the optical path connecting the optical center of lens 48 with the location of diode 64. Usually diode 64 is selected to radiate in the infrared, non-visible portion of the spectrum so that the emitting beam cannot be observed by an intruder. Rotation of carriage 38 and lens unit 40 about axes 42 and 44, respectively, will cause respective azimuth and elevation adjustment of the direction of external optical axis 41 without changing the direction or location of internal optical axis 43.

Figure 4:
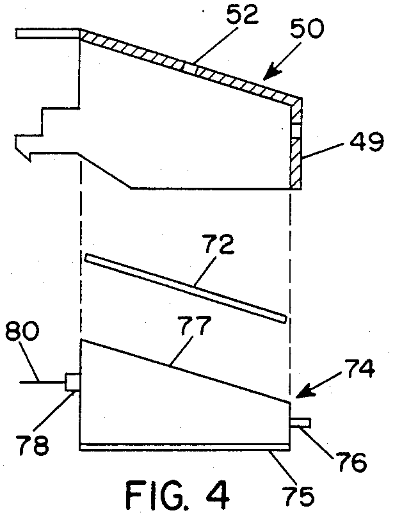
FIG. 4 is an exploded side cross-section view taken substantially along the line 3—3 of FIG. 2, and represents a unit used in connection with a receiver.

FIG. 4 is an exploded cross-section view of an enclosure corresponding to enclosure 36 which is used in connection with a receiver having an alignment apparatus in accordance with the present invention. The enclosure 49 and reflective surface 50 is identical to the enclosure 36 and upper reflecting surface 37 used in connection with a transmitter. Within enclosure 49 the receiver includes a visible light filter 72 and a further metallic box 74 containing components of the receiver which would be sensitive to electromagnetic radiation. Metallic box 74 provides for radio frequency isolation and has a main portion 77 and a rear cover 75 which is removable for purposes of assembly and/or repair.

Figure 5:
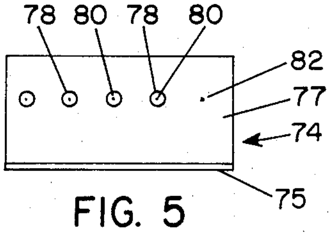
FIG. 5 is a side view of the exploded left side portion of FIG. 4.

FIG. 5 is a side view of metallic box 74 showing RF isolating feed through capacitors 78 on the left-hand surface of portion 77, through which connection wires 80 pass for connection to circuit board 30. A ground wire 82 is passed through a smaller hole and connected to the metallic box portion 77. A light emitting diode 76 protrudes from the right surface of the box 74 as illustrated in FIG. 4 and may be an alarm indicating lamp.

Figure 8:
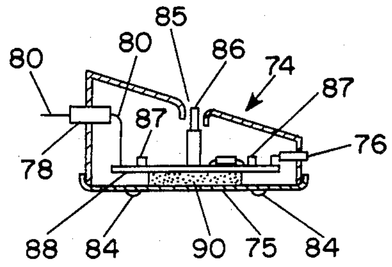
FIG. 8 is a side cross-sectional view of the exploded bottom portion of FIG. 4.
Figure 9:
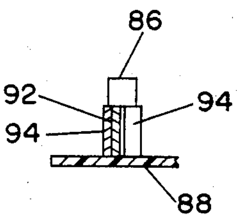
FIG. 9 is an enlarged side cross-sectional view of the receiving photodetector of the receiver.

FIG. 8 is a cross-sectional view of metallic box 74 showing additional details of the inner assembly of the metallic box, which includes a circuit board 88 that is mounted against tabs 87 projecting inwardly from the side walls of metallic box portion 77. An aperture 85 is formed in metallic box portion 77 for receiving photodetector 86 which is connected to circuit board 88 and spaced therefrom by tubular spacers 94 surrounding leads 92, as is illustrated in detail in FIG. 9. A foam cushion 90 is mounted on the interior surface of cover 75 and serves to press circuit board 88 against tabs 87 to maintain the same in a proper position and accordingly maintain photodetector 86 in a proper location within aperture 85. Cover 75 is held against the main portion 77 of box 74 by tabs 84, which pass through slots in cover 75 and are thereafter bent to hold cover 75 in position. The optical arrangement for the receiver is the same as described for the transmitter.

Figure 6:
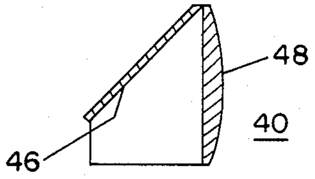
FIG. 6 is an partial cross-section view of the lens unit of the transmitter or receiver.
Figure 7:
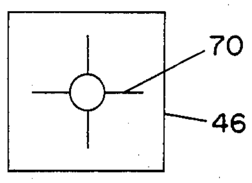
FIG. 7 illustrates the etched sight pattern on the mirror surface of the lens unit of the transmitter or receiver.

FIGS. 6 and 7 show further details of the lens unit 40 used in the transmitter or receiver shown in FIG. 1. Lens unit 40 is formed out of molded plastic and includes a mirror surface 46 formed on one part thereof and a lens 48. Mirror surface 46 serves the purpose of changing the direction of transmitted or received radiation between horizontal and vertical optical axis directions. Mirror surface 46, which may be formed by aluminum plating a portion of the plastic lens unit 40, includes an etched sight pattern 70 which is illustrated in FIG. 7.

Alignment of the transmitter or receiver 10 in accordance with the present invention will now be explained with reference to FIG. 1. The installing technician first mounts both the transmitter and the receiver on vertical surfaces 22 at positions which are within sight of each other in a generally horizontal direction within the three opened sides of each unit. After mounting the units the technician will go to the first of the units and position himself to observe the upper reflective surface 37 of enclosure 36 from a position 96 as illustrated in FIG. 1. The technician will recognize reaching the appropriate viewing position when the aperture 52 of enclosure 36 is centered on the reflected image of the sight etching 70 of mirror surface 46 which is illustrated in FIG. 7. At this point the technician will observe the field of view of focusing lens 48 which forms a virtual image on the upper reflecting surface 37 of enclosure 36. The technician may then rotate carrier 38 about vertial axis 42 and rotate lens unit 40 about horizontal axis 44 to adjust the field of view of the transmitter or receiver unit to align the optical axis 41 thereof with the other unit which he has mounted. Proper alignment is achieved when the other unit can no longer be seen in the upper reflective surface 37 of enclosure 36, since the image of the other unit is then centered on aperture 52. Accordingly, the other unit "drops" into the hole formed by aperture 52 and the unit is properly aligned. The second unit can be aligned in a corresponding procedure.

While there has been described what is believed to be the preferred embodiments of the present invention, those skilled in the art will recognize that other and further modifications may be made thereto without departing from the spirit of the invention, and it is intended to claim all such changes and modifications as fall within the true scope of the invention.

I claim:

1. In a directionally adjustable transmitter for a photoelectric detecting system including focusing means having a real focal point, a source of optical radiation located near said focal point and defining an optical axis, an alignment apparatus, comprising:

a first plane mirror located between said radiation source and said focusing means near said focal point, having an aperture on said optical axis, and being mounted at a selected angle with respect to said optical axis;

and a center-line indicating sight, visible in said first plane mirror, and centered about said optical axis;

whereby the field of view of said transmitter can be observed in said first plane mirror and when said first plane mirror is observed at a viewing angle to center said center-line indicating sight over said aperture, a virtual image of the field of view surrounding the optical axis of said focusing means is visible in said first plane mirror, and said aperture is aligned with said optical axis in said virtual image.

2. An alignment apparatus as specified in claim 1 wherein said first plane mirror is arranged within a housing having a removable cover, and wherein said selected angle is selected to cause said viewing angle to be outside said housing.

3. An alignment apparatus as specified in claim 2 wherein said selected angle is approximately 17 degrees between said optical axis and a direction normal to said first plane mirror.

4. An alignment apparatus as specified in claim 1 wherein said focusing means includes a lens and a second plane mirror between said lens and said radiation source for changing the direction of said optical axis, and wherein said center-line indicating sight is etched on said second plane mirror.

5. An alignment apparatus as specified in claim 4 wherein said lens and said second plane mirror are mounted on a carriage to be pivotable in azimuth and elevation, thereby to adjust the direction of said optical axis outside said transmitter.

6. An alignment apparatus as specified in claim 1 wherein said first plane mirror forms one surface of an enclosure, and wherein said radiation source is mounted within said enclosure.

7. In a directionally adjustable receiver for a photoelectric detecting system including focusing means having a real focal point, a detector of optical radiation located near said focal point and defining an optical axis, an alignment apparatus, comprising:

a first plane mirror located between said radiation detector and said focusing means near said focal point, having an aperture on said optical axis, and being mounted with a selected angle with respect to said optical axis;

and a center-line indicating sight, visible in said first plane mirror, and centered about said optical axis;

whereby the field of view of said receiver can be observed in said first plane mirror and when said first plane mirror is observed at a viewing angle to center said center-line indicating sight over said aperture, a virtual image of the field of view surrounding the optical axis of said focusing means is visible in said first plane mirror and said aperture is aligned with said optical axis in said virtual image.

8. An alignment apparatus as specified in claim 7 wherein said first plane mirror is arranged within a housing having a removable cover, and wherein said selected angle is selected to cause said viewing angle to be outside said housing.

9. An alignment apparatus as specified in claim 8 wherein said selected angle is approximately 17 degrees between said optical axis and a direction normal to said first plane mirror.

10. An alignment apparatus as specified in claim 7 wherein said focusing means includes a lens and a second plane mirror between said lens and said radiation detector for changing the direction of said optical axis, and wherein said center-line indicating sight is etched on said second plane mirror.

11. An alignment apparatus as specified in claim 10 wherein said lens and said second plane mirror are mounted on a carriage to be pivotable in azimuth and elevation, thereby to adjust the direction of said optical axis outside said receiver.

12. An alignment apparatus as specified in claim 7 wherein said first plane mirror forms one surface of an enclosure, and wherein said radiation detector is mounted within said enclosure.

13. An alignment apparatus as specified in claim 12 wherein said radiation detector is mounted within a metallic box within said enclosure, said metallic box providing radio frequency isolation and having external leads emerging from said metallic box through isolating capacitors.

14. An alignment apparatus as specified in claim 13 wherein said radiation detector is mounted within said metallic box by leads connected to a circuit board and is spaced from said circuit board by tubular spacers surrounding said leads.

15. An alignment apparatus as specified in claim 14 wherein said metallic box includes a cover on the side of said circuit board opposite said detector and wherein there is provided a comprehensible foam cushion between said circuit board and said cover.

* * * * *